US012676125B2

(12) United States Patent
Luo et al.

(10) Patent No.: US 12,676,125 B2
(45) Date of Patent: Jul. 7, 2026

(54) METHOD FOR SHORTENING DISPLAY LATENCY BASED ON VARIABLE REFRESH RATE TECHNOLOGY AND RELATED RENDERING DEVICE THEREOF

(71) Applicant: Realtek Semiconductor Corp., HsinChu (TW)

(72) Inventors: Po-Hsin Luo, HsinChu (TW); Kai-Hsiang Chou, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/633,482

(22) Filed: Apr. 11, 2024

(65) Prior Publication Data

US 2025/0149008 A1 May 8, 2025

(30) Foreign Application Priority Data

Nov. 3, 2023 (TW) ................................. 112142405

(51) Int. Cl.
*G09G 5/00* (2006.01)
*A63F 13/355* (2014.01)
*A63F 13/358* (2014.01)

(52) U.S. Cl.
CPC ........... *G09G 5/006* (2013.01); *A63F 13/355* (2014.09); *A63F 13/358* (2014.09); *G09G 2340/0435* (2013.01)

(58) Field of Classification Search
CPC ........... G09G 5/006; G09G 2340/0435; A63F 13/355; A63F 13/358
See application file for complete search history.

(56) References Cited

U.S. PATENT DOCUMENTS

| | | | | |
|---|---|---|---|---|
| 8,194,065 B1 * | 6/2012 | Walker | ..................... | G09G 3/20 |
| | | | | 345/545 |
| 9,589,540 B2 * | 3/2017 | Wu | ........................ | G06F 1/3265 |
| 10,019,968 B2 * | 7/2018 | Bi | ........................... | G09G 5/393 |
| 11,322,077 B1 * | 5/2022 | Chun | ................... | G09G 3/3208 |
| 11,574,576 B1 * | 2/2023 | Von Hippel | .......... | G09G 5/363 |
| 11,700,402 B1 * | 7/2023 | Dimitrov | .............. | H04L 65/612 |
| | | | | 725/144 |
| 11,776,502 B1 * | 10/2023 | Waggoner | .............. | G09G 5/006 |
| | | | | 345/204 |

(Continued)

FOREIGN PATENT DOCUMENTS

| | | | | | |
|---|---|---|---|---|---|
| CN | 111554218 A | * | 8/2020 | ............. | G09G 3/006 |
| CN | 119729049 A | * | 3/2025 | | |

(Continued)

*Primary Examiner* — William Lu
(74) *Attorney, Agent, or Firm* — Winston Hsu

(57) ABSTRACT

A method for displaying a video stream on a display device with a variable refresh rate function is provided. The method includes: receiving the video stream and decoding the video stream to generate a plurality of decoded video frames; determining a frame ready time for each of the decoded video frames; determining a frame display time for each of the decoded video frames; determining a target refresh rate for the display device based on a frame latency between the frame ready time and the frame display time corresponding to at least one of the decoded video frames; and controlling the display device to display the video stream at the target refresh rate.

14 Claims, 5 Drawing Sheets

(56)  References Cited

U.S. PATENT DOCUMENTS

| | | | | |
|---|---|---|---|---|
| 11,776,507 | B1* | 10/2023 | Svirid | G09G 5/363 |
| | | | | 345/522 |
| 11,782,540 | B2* | 10/2023 | Koo | G06F 3/04166 |
| | | | | 345/173 |
| 2007/0057952 | A1* | 3/2007 | Swedberg | H04N 21/43072 |
| | | | | 345/474 |
| 2013/0141642 | A1* | 6/2013 | Wu | G09G 5/363 |
| | | | | 348/E7.001 |
| 2014/0092150 | A1* | 4/2014 | Slavenburg | G09G 5/001 |
| | | | | 345/698 |
| 2014/0198138 | A1* | 7/2014 | Nambi | G09G 3/36 |
| | | | | 345/87 |
| 2014/0218350 | A1* | 8/2014 | Wee | G09G 5/003 |
| | | | | 345/212 |
| 2014/0267448 | A1* | 9/2014 | Albrecht | G09G 3/3406 |
| | | | | 345/84 |
| 2015/0194137 | A1* | 7/2015 | Wyatt | G09G 5/393 |
| | | | | 345/173 |
| 2016/0092010 | A1* | 3/2016 | Agarwal | G06F 3/0412 |
| | | | | 345/173 |
| 2016/0093239 | A1* | 3/2016 | Wang | G06F 1/32 |
| | | | | 345/55 |
| 2016/0196801 | A1* | 7/2016 | Glen | G09G 5/003 |
| | | | | 345/213 |
| 2016/0275905 | A1* | 9/2016 | Sacchetto | G09G 5/006 |
| 2016/0275919 | A1* | 9/2016 | Lawrence | G09G 5/39 |
| 2017/0040001 | A1* | 2/2017 | Zhang | G09G 5/18 |
| 2017/0064300 | A1* | 3/2017 | Yang | H04N 19/172 |
| 2017/0092340 | A1* | 3/2017 | Zheng | G06F 3/14 |
| 2017/0124934 | A1* | 5/2017 | Verbeure | G09G 3/3611 |
| 2017/0193971 | A1* | 7/2017 | Bi | G09G 5/18 |
| 2017/0243548 | A1* | 8/2017 | Wang | G09G 3/20 |
| 2017/0374647 | A1* | 12/2017 | Oyman | H04W 48/18 |
| 2019/0156785 | A1* | 5/2019 | Marchya | G09G 3/2096 |
| 2019/0172427 | A1* | 6/2019 | Saini | G09G 5/18 |
| 2020/0082781 | A1* | 3/2020 | An | G09G 5/003 |
| 2020/0104973 | A1* | 4/2020 | Zhang | G09G 5/12 |
| 2020/0177947 | A1* | 6/2020 | Hui | H04L 65/65 |
| 2020/0327862 | A1* | 10/2020 | Sinha | G09G 5/003 |
| 2021/0093955 | A1* | 4/2021 | Cerny | A63F 13/355 |
| 2021/0093958 | A1* | 4/2021 | Yong | A63F 13/30 |
| 2021/0104206 | A1* | 4/2021 | Koo | G09G 5/363 |
| 2022/0013087 | A1* | 1/2022 | Marchya | G09G 5/363 |
| 2023/0395041 | A1* | 12/2023 | Fitzgerald | H04N 21/440281 |
| 2024/0112296 | A1* | 4/2024 | Skaljak | H04N 7/0127 |
| 2024/0153449 | A1* | 5/2024 | Zhong | G06F 3/0442 |
| 2024/0161852 | A1* | 5/2024 | Laslo | G11C 29/12005 |

FOREIGN PATENT DOCUMENTS

| | | | | |
|---|---|---|---|---|
| WO | 2021/145727 | A1 | 7/2021 | |
| WO | WO-2024117479 | A1* | 6/2024 | H04N 21/2402 |

* cited by examiner

METHOD FOR SHORTENING DISPLAY LATENCY BASED ON VARIABLE REFRESH RATE TECHNOLOGY AND RELATED RENDERING DEVICE THEREOF

BACKGROUND OF THE INVENTION

1. Field of the Invention

The present invention relates to display technology, and in particular to a method of reducing video display latency through variable refresh rate technology and a related rendering device.

2. Description of the Prior Art

Nowadays, with increasing popularity of electronic products and cloud/streaming gaming, there is a growing demand for low-latency experiences in cloud gaming. During operations of cloud/streaming games, a deviation in synchronization between gaming feedback and audio/video presentation may degrade gaming experience. Therefore, reducing video display latency in cloud/streaming gaming is of significant importance. Conventional methods to reduce video display latency mainly include two approaches: one is synchronizing by adjusting the number (size) of video buffers, and the other is accelerating video updating speed by increasing display refresh rate. However, both these methods have certain drawbacks. Adjusting the number of video buffers may lead to dropped frames, while increasing the display refresh rate may increase computational load on cloud/streaming game servers and video decoding load on the playback side. Thus, there is a need in the art for an innovative method to improve display latency.

SUMMARY OF THE INVENTION

In light of this, it is one object of the present invention to provide a mechanism to reduce display latency using variable refresh rate technology. In embodiments of the present invention, frame latency corresponding to each video frame will be statistically analyzed. Based on variable refresh rates supported by display devices, refresh rates of the display devices will be dynamically adjusted, thereby reducing display latency of video streams displayed on the display devices.

According to one embodiment, a method for displaying a video stream on a display device with a variable refresh rate function is provided. The method comprises: receiving the video stream and decoding the video stream to generate a plurality of decoded video frames; determining a frame ready time for each of the decoded video frames; determining a frame display time for each of the decoded video frames; determining a target refresh rate for the display device based on a frame latency between the frame ready time and the frame display time corresponding to at least one of the decoded video frames; and controlling the display device to display the video stream at the target refresh rate.

According to one embodiment, a rendering device for controlling a display device with variable refresh rate function is provided. The rendering device comprises: a decoding unit and a refresh rate control unit. The decoding unit is configured to receive a video stream and decoding the video stream to generate a plurality of decoded video frames. The refresh rate control unit is coupled to the decoding unit, and configured to determine a frame ready time for each of the decoded video frames, and a frame display time for each of the decoded video frames, and accordingly determine a target refresh rate for the display device based on a frame latency between the frame ready time and the frame display time corresponding to at least one of the decoded video frames. Specifically, the rendering device is configured to control the display device to display the video stream at the target refresh rate.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
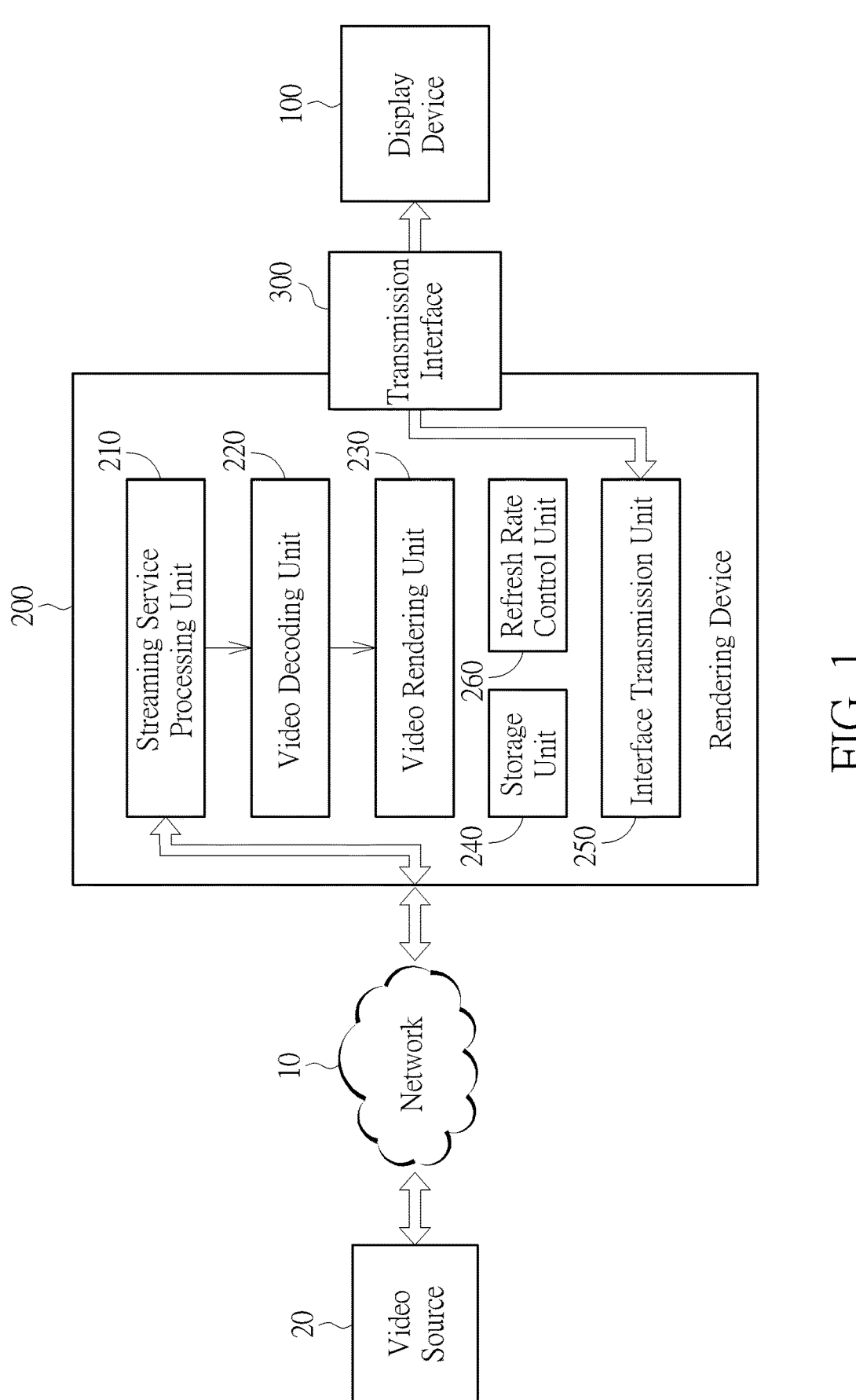
FIG. 1 is a schematic diagram of a rendering device and its application according to one embodiment of the present invention.

FIG. 1 illustrates a schematic diagram of a rendering device and its application architecture according to one embodiment of the present invention. As shown in FIG. 1, a rendering device 200 is configured to receive a video stream from a video source 20 via a network 10 and accordingly decode the video stream. The rendering device 200 sends video signals to a display device 100 through a transmission interface 300 to control displaying of decoded video contents of the video stream on the display device 100. In one embodiment, the rendering device 200 can be a streaming media player, a smart TV box, a gaming console, and so on. Furthermore, the display device 100 can be various types of display devices or televisions supporting variable refresh rate (VRR) technology, such as liquid crystal display (LCD) devices/televisions, organic light-emitting diode (OLED) display devices/televisions, or micro-LED display devices/televisions, and so on.

In one embodiment, the network 10 can be a wired network, a wireless network, or a combination of both. The wired network may include Ethernet, modem lines, optical fiber networks, and so on. The wired network further includes hardware devices capable of providing wired network connectivity, including but not limited to routers, switches, bridges, and so on. Such devices connect various network nodes together and manage data exchange between these nodes. Moreover, the wireless network may include Wi-Fi, Bluetooth, mobile telecommunications networks (such as 4G LTE, 5G), satellite communication networks, and so on. The wireless network also includes hardware devices capable of providing wireless network connectivity, including but not limited to wireless routers, Access Points (AP), mobile network base stations (such as 4G base stations, 5G base stations), and so on. Such devices connect wireless devices together and manage flow of data therebetween. In embodiments of hybrid networks, hardware devices of the wired and wireless networks may be combined to offer more flexible network connectivity. For example, a Wi-Fi access point may be connected to a wired Ethernet network, allowing Wi-Fi devices to access remote data through the Ethernet network.

In one embodiment, the video source 20 can be a server that provides cloud gaming services to the rendering device 200 in the form of video streams via the network 10. For instance, the server can be a cloud gaming service platform, such as Stadia by Google or GeForce Now by NVIDIA, where games are run on the server and gaming graphics are encoded using specific video compression techniques. Encoded video data is transmitted to the rendering device 200 via the network 10. Alternatively, the video source 20 can also be a wireless projection (or wireless display) source device, such as mobile devices including smartphones or tablets or any device supporting wireless projection or display functions. Such wireless projection source device can provide its video content to the rendering device 200 via network 10 based on wireless projection or wireless display protocols such as Miracast, AirPlay, Chromecast, and so on. For example, real-time screen of a smartphone/tablet, or local or network video content being played on the smartphone/tablet, can be transmitted to the rendering device 200 via AirPlay protocol, or video content from specific applications can be shared via Chromecast protocol.

In one embodiment, the transmission interface 300 may be based on specific data transmission standards, such as High Definition Multimedia Interface (HDMI), DisplayPort (DP), or Thunderbolt. These interfaces can support data transmission from the rendering device 200 to the display device 100, including video data, audio data, control commands, and so on. The transmission interface 300 allows the rendering device 200 to send specific control commands to dynamically change a refresh rate of the display device 100. To achieve dynamic adjustment of the refresh rate, the rendering device 200 can adopt various VRR technologies. For example, using VRR technologies such as, G-SYNC by NVIDIA or FreeSync by AMD to send refresh rate adjustment commands to the display device 100, requesting the display device 100 to change to and operate at a specific refresh rate, such as various rates between 48 and 240 Hz.

The rendering device 200 includes a streaming service processing unit 210, a video decoding unit 220, a video rendering unit 230, a storage unit 240, an interface transmission unit 250, and a refresh rate control unit 260. The streaming service processing unit 210 is configured to send requests to the video source 20 via the network 10, thereby receiving video streams provided by the video source 20.

The video decoding unit 220 is configured to decode the video streams to generate decoded video frames, which are then written into the storage unit 240, wherein the storage unit 240 can be dynamic random access memory (DRAM). The video rendering unit 230 is configured to select a next appropriate decoded video frame from decoded video frames stored in the storage unit 240. The next appropriate decoded video frame is sent to the interface transmission unit 250. The interface transmission unit 250 is configured to converts the next appropriate decoded video frame into signals conforming to specific transmission specifications. In one embodiment, the interface transmission unit 250 can be an HDMI transmission unit. The interface transmission unit 250 transmits video data, synchronization signals, and control signals to the display device 100, based on the transition minimized differential signaling (TMDS) timing.

During vertical blank interval (e.g., control periods in TMDS timing of HDMI), the video rendering unit 230 selects the next appropriate decoded video frame from the storage unit 240 for being displayed by the display device 100. On the other hand, the time each decoded video frame is written into the storage unit 240 is recorded as a frame ready time FRT, such as in the form of timestamps. When a decoded video frame is selected by the video rendering unit 230, an expected display time of the above decoded video frame can be determined based on the timing of the vertical synchronization (V-sync) signal of the display device 100, which can be considered as a frame display time FDT corresponding to the decoded video frame. The time difference between the frame ready time FRT and the frame display time FDT can then determine a frame latency FL.

Furthermore, the refresh rate control unit 260 changes the refresh rate of the display device 100 based on the video display latency. The refresh rate control unit 260 activates the VRR function of the display device 100 through the interface transmission unit 250 and instructs the interface transmission unit 250 to change the timing (frequency) of the vertical synchronization signal VSYNC, thereby changing the refresh rate of the display device 100 to reduce video display latency. Please refer to the following embodiments for more details on how the refresh rate control unit 260 changes the refresh rate of the display device 100 based on video display latency.

Figure 2:
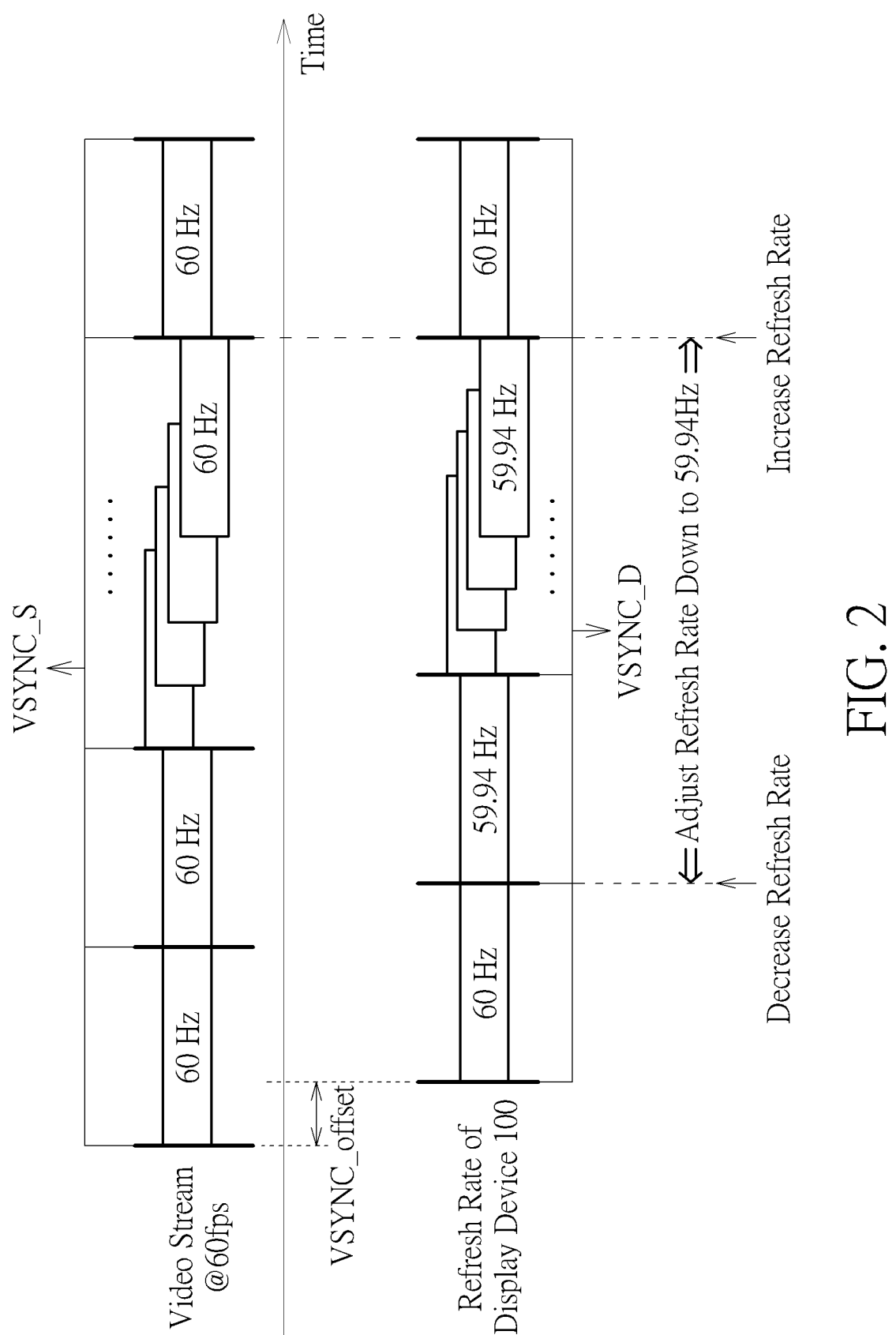
FIG. 2 illustrates how to shorten video display latency according to one embodiment of the present invention.

Please refer to FIG. 2. In an embodiment shown by FIG. 2, it is assumed that a frame rate of the video stream is 60 fps (i.e., corresponding to refresh rate of 60 Hz) within a certain period. Simultaneously, the refresh rate of the display device 100 is also 60 Hz. As shown in the figure, there is an offset (i.e., out-of-sync) between a vertical synchronization signal VSYNC S of the video source 20 and a vertical synchronization signal VSYNC D of the display device 100, meaning a vertical synchronization signal offset VSYNC Offset is greater than 0. When the refresh rate control unit 260 calculates that the vertical synchronization signal offset VSYNC Offset is greater than 0 (or exceeds a threshold), the refresh rate control unit 260 adjusts the refresh rate of the display device 100 from default 60 Hz to 59.94 Hz by using VRR technology. Subsequently, the refresh rate control unit 260 keeps calculating the vertical synchronization signal offset VSYNC Offset. After a period, when the vertical synchronization signal offset VSYNC Offset falls below a predetermined value (i.e., time difference), the refresh rate control unit 260 adjusts the refresh rate of the display device 100 back to the default 60 Hz using VRR technology. In some embodiments, when the refresh rate control unit 260 calculates that the vertical synchronization signal offset VSYNC Offset falls below the predetermined value, the refresh rate control unit 260 does not immediately adjust the refresh rate of the display device 100 back to 60 Hz but gradually transitions the refresh rate from 59.94 Hz back to 60 Hz over a period.

Figure 3:
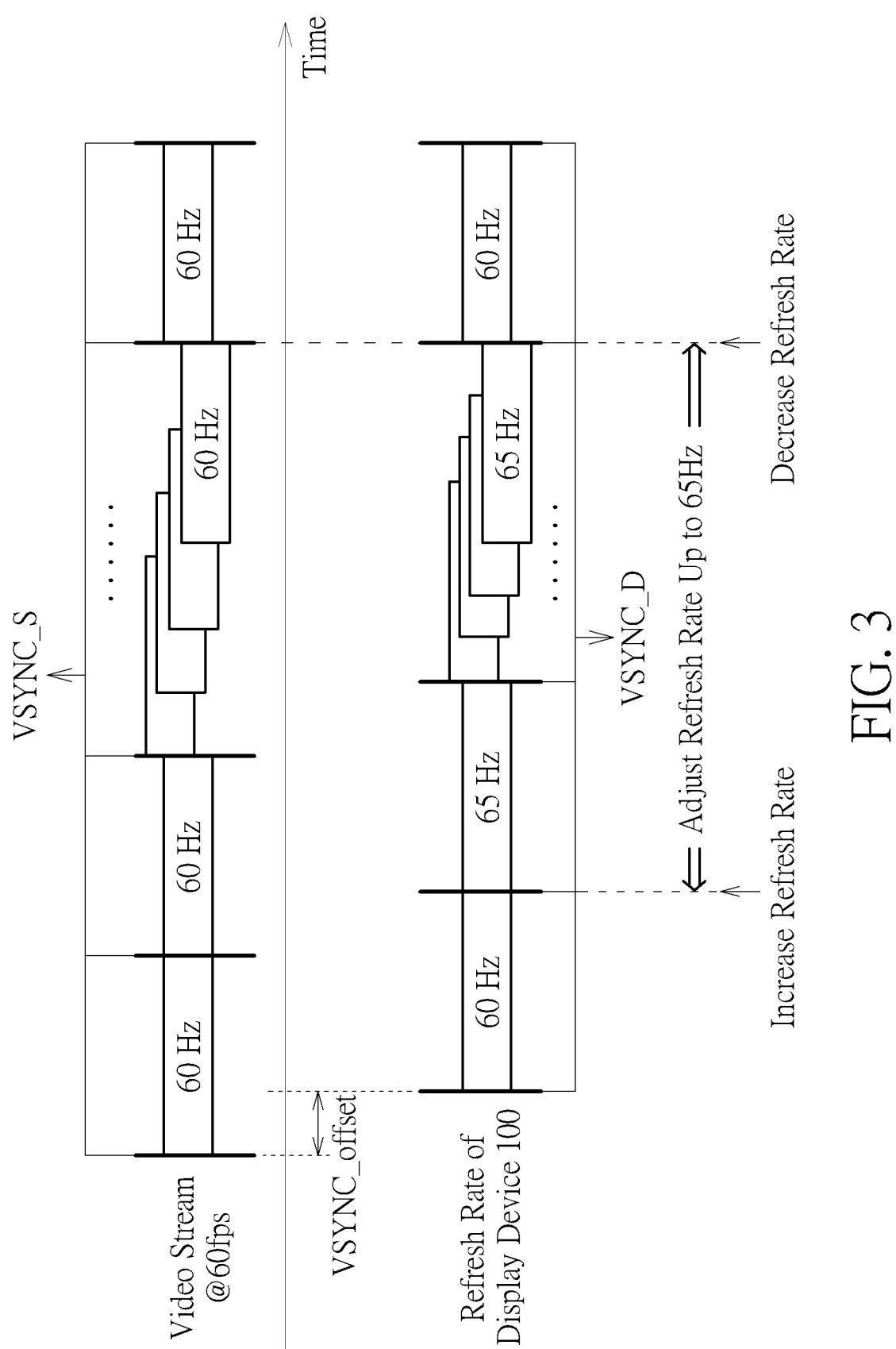
FIG. 3 illustrates how to shorten video display latency according to another embodiment of the present invention.

In an embodiment illustrated by FIG. 3, it is assumed that the frame rate of the video stream is 60 fps (i.e., 60 Hz), and the refresh rate of the display device 100 is also 60 Hz within a certain period. However, as shown in the figure, there is an offset between the vertical synchronization signal VSYNC S of the video source 20 and the vertical synchronization signal VSYNC D of the display device 100, meaning the vertical synchronization signal offset VSYNC Offset is greater than 0. When the refresh rate control unit 260 calculates that the the vertical synchronization signal offset VSYNC Offset is greater than 0 (or exceeds a threshold), it uses VRR technology to increase the refresh rate of the display device 100 from the default 60 Hz to 65 Hz. The refresh rate control unit 260 then keeps calculating the vertical synchronization signal offset VSYNC Offset. After a period, when the vertical synchronization signal offset VSYNC Offset falls below a predetermined value (i.e., time difference), the refresh rate control unit 260 adjusts the refresh rate of the display device 100 back to the default 60 Hz using VRR technology. In some embodiments, when the refresh rate control unit 260 calculates that the vertical synchronization signal offset VSYNC Offset falls below the predetermined value, the refresh rate control unit 260 does not immediately adjust the refresh rate of the display device 100 back to 60 Hz but gradually transitions the refresh rate from 65 Hz back to 60 Hz over a period.

In the above embodiments, the refresh rate control unit 260 calculates and detects the offset between the vertical synchronization signal VSYNC_S of the video source 20 and the vertical synchronization signal VSYNC_D of the display device 100 (i.e., the vertical synchronization signal offset VSYNC_Offset) to control the refresh rate of the display device 100. However, in the following embodiments, the refresh rate control unit 260 adjusts the refresh rate of the display device 100 based on statistical data.

Figure 4:
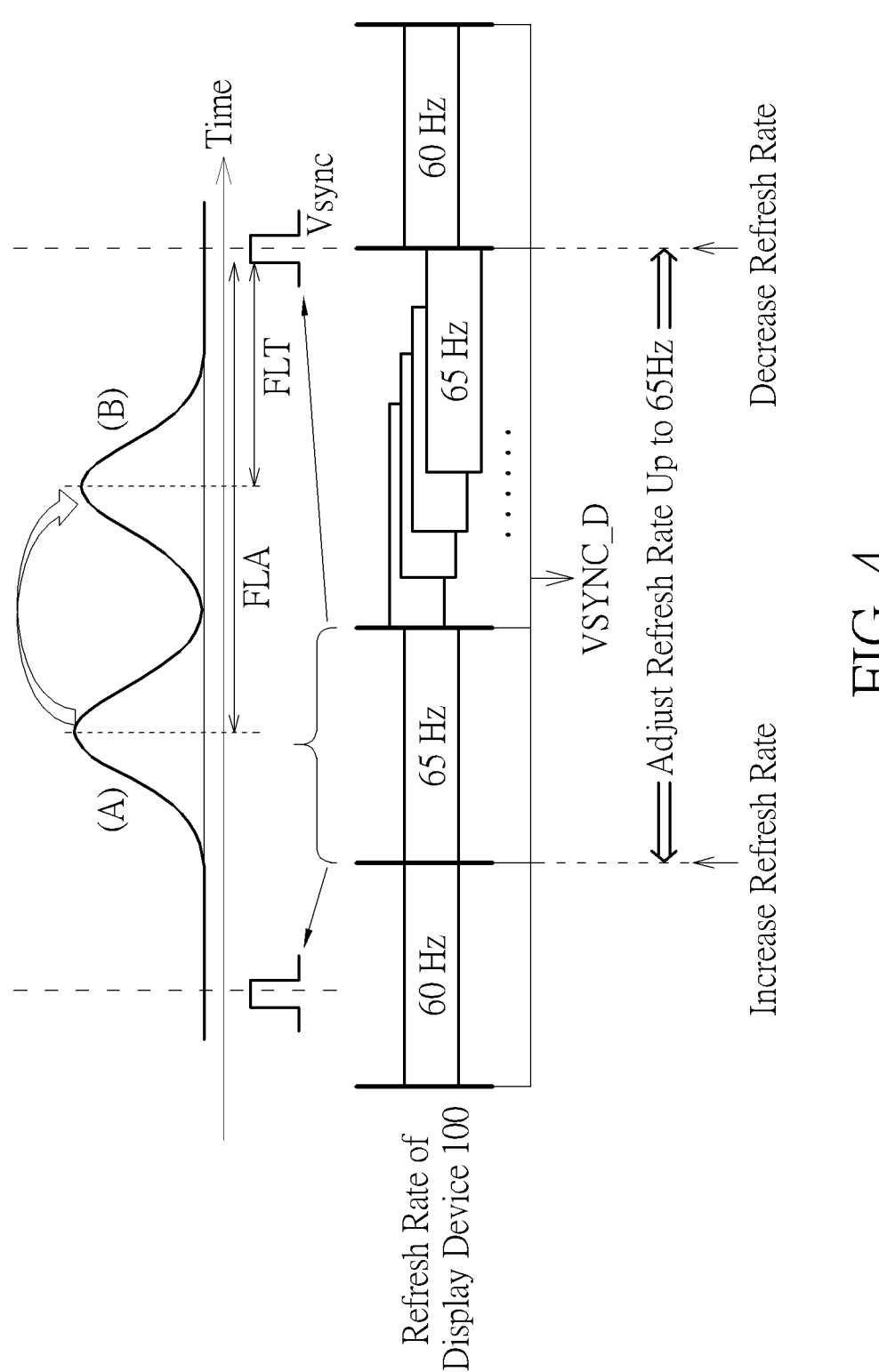
FIG. 4 illustrates how to shorten video display latency according to still another embodiment of the present invention.

In one example illustrated by FIG. 4, the refresh rate control unit 260 records timestamps regarding video frames from the completion of decoding to being sent to the display device 100, to obtain relevant statistical data. More specifically, the refresh rate control unit 260 calculates an average frame latency FLA (in milliseconds, for example) based on frame latency (FL) corresponding to a specific number of decoded video frames or decoded video frames generated within a time period (i.e., statistical data (A)). In one embodiment, this specific number might range from 1 to 120, meaning the refresh rate control unit 260 could calculate the average frame latency FLA based on FL corresponding to 1 to 120 decoded video frames.

Furthermore, when the average frame latency FLA exceeds a predetermined video latency threshold (e.g., FLT), the refresh rate control unit 260 identifies this as an excessive latency. At this point, the refresh rate control unit 260 uses VRR technology to adjust the refresh rate of the display device 100 from 60 Hz to 65 Hz. Subsequently, the refresh rate control unit 260 continues to calculate the average frame latency FLA (i.e., statistical data (B)). After a certain period, when the average frame latency FLA falls below the video latency threshold FLT, the refresh rate control unit 260 adjusts the refresh rate of the display device 100 back to 60 Hz (or gradually to 60 Hz over a period) via the interface transmission unit 250. In one embodiment, the refresh rate control unit 260 may determine to increase or decrease the refresh rate of display device 100 based on the magnitude of the latency. For a video stream of 60 fps, the average frame latency FLA might range between 0 to 16.67 (ms). If the average frame latency FLA falls between 0 and FLT (ms), the refresh rate control unit 260 may choose to decrease the refresh rate of display device 100, thereby to increase the average frame latency FLA. On the other hand, if the average frame latency FLA falls between FLT to 16.67 (ms), the refresh rate control unit 260 may choose to increase the refresh rate of display device 100 to reduce the average frame latency FLA. In one embodiment, if the frame rate of the video stream is 60 fps and a maximum supported refresh rate of display device 100 is 60 Hz, the refresh rate control unit 260 can only adjust the average frame latency FLA by decreasing the refresh rate of the display device 100.

In one embodiment, the refresh rate control unit 260 is configured to set a target frame latency (in milliseconds, for instance). For example, the refresh rate control unit 260 sets the video latency threshold FLT as the target frame latency. Furthermore, the refresh rate control unit 260 also sets a VRR control period T, which represents a duration of applying VRR control (e.g., increasing or decreasing the initial refresh rate) to the display device 100. The target frame latency FLT represents expected average frame latency achievable after the VRR control is applied within the VRR control period T. Based on the average frame latency FLA, the target frame latency FLT, and the VRR control period T, the refresh rate control unit 260 can determine the target refresh rate VrrF. That is, under VRR control, the refresh rate of display device 100 is adjusted from the initial refresh rate F to the target refresh rate VrrF. The target refresh rate VrrF can be determined by the following equation: $VrrF = 1000/((1000/F) - (FLA - FLT)/T)$. Additionally, the VRR control period T can be determined by: $T = (F*VrrF*(FLA - FLT))/(1000*(VrrF - F))$. Through these methods, the rendering device 200 can more actively and efficiently apply VRR control to the display device 100, thereby reducing video display latency.

Figure 5:
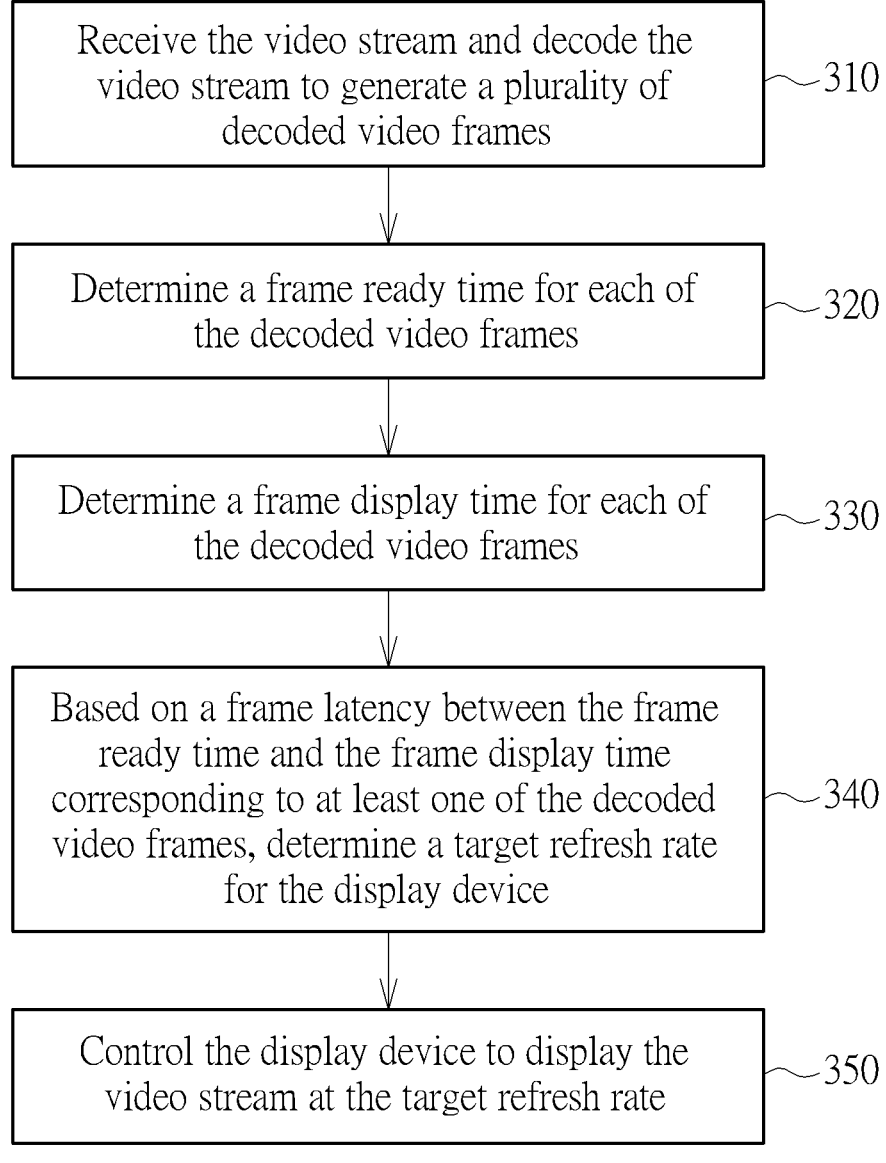
FIG. 5 is a flow chart of a method of controlling a display device according to one embodiment of the present invention.

FIG. 5 illustrates a method of displaying a video stream on a display device with a variable refresh rate function. As shown in the figure, the method of the present invention includes a following simplified flow:

Step S310: receive the video stream and decode the video stream to generate a plurality of decoded video frames;

Step S320: determine a frame ready time for each of the decoded video frames;

Step S330: determine a frame display time for each of the decoded video frames;

Step S340: based on a frame latency between the frame ready time and the frame display time corresponding to at least one of the decoded video frames, determine a target refresh rate for the display device; and Step S350: control the display device to display the video stream at the target refresh rate.

Since principles and details of the above steps have been described in detail through the above embodiments, they are not repeated here. It is noteworthy that the above flow may be improved by adding additional steps or making appropriate modifications and adjustments, to better enhance the quality of video display and reduce latency.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for displaying a video stream on a display device with a variable refresh rate function, comprising:

receiving the video stream and decoding it to generate a plurality of decoded video frames;

determining a frame ready time for each of the decoded video frames, wherein the frame ready time corresponds to a time that a decoded video frame is written into a storage unit;

determining a frame display time for each of the decoded video frames, wherein the frame display time corresponds to an expected display time of a decoded video frame;

determining a target refresh rate for the display device based on a frame latency between the frame ready time and the frame display time corresponding to at least one of the decoded video frames, wherein the target refresh rate is selected from one of a predetermined and constant low refresh rate that is lower than a frame rate of the video stream and a predetermined and constant high refresh rate that is higher than the frame rate of the video stream, comprising:

determining an average frame latency based on frame latencies corresponding to the plurality of the decoded video frames;

selecting a refresh rate that is lower than the frame rate as the target refresh rate when the average frame latency falls within a first range between 0 and a predetermined video latency threshold; and

selecting a refresh rate that is higher than the frame rate as the target refresh rate when the average frame latency falls within a second range between the predetermined video latency threshold and a frame period of the plurality of the decoded video frames; and controlling the display device to display the video stream at the target refresh rate.

2. The method of claim 1, further comprising:

controlling the display device to operate at the target refresh rate when the frame latency exceeds a predetermined value; and controlling the display device to operate at a default refresh rate when the frame latency is below the predetermined value.

3. The method of claim 2, wherein the step of determining the target refresh rate for the display device comprises:

setting a refresh rate that is lower than the default refresh rate as the target refresh rate if the default refresh rate of the display device corresponds to a frame rate of the video stream and the frame latency exceeds the predetermined value.

4. The method of claim 2, wherein the step of determining the target refresh rate for the display device comprises:

setting a refresh rate that is lower than the default refresh rate as the target refresh rate if the frame latency falls within a first numerical range; and setting a refresh rate that is higher than the default refresh rate as the target refresh rate if the frame latency falls within a second numerical range.

5. The method of claim 1, wherein the step of determining the target refresh rate for the display device comprises:

determining an average frame latency based on frame latencies between the frame ready time and the frame display time of a specific number of decoded video frames among the plurality of decoded video frames; and determining the target refresh rate based on the average frame latency, a target frame latency, and a variable refresh rate control period.

6. The method of claim 1, wherein the video stream is provided by a video source, and the video source is a cloud gaming service platform or a wireless projection source device.

7. The method of claim 1, wherein the frame ready time of a decoded video frame corresponds to the time when the decoded video frame is written to a storage unit of the rendering device, and the frame display time of the decoded video frame corresponds to the timing of a vertical synchronization signal corresponding to displaying the decoded video frame on the display device.

8. A rendering device for controlling a display device with a variable refresh rate function, comprising:

a decoding unit configured to receive a video stream and decoding the video stream to generate a plurality of decoded video frames; and a refresh rate control unit, coupled to the decoding unit, configured to determine a frame ready time for each of the decoded video frames, and a frame display time for each of the decoded video frames, and accordingly determine a target refresh rate for the display device based on a frame latency between the frame ready time and the frame display time corresponding to at least one of the decoded video frames, wherein the frame ready time corresponds to a time that a decoded video frame is written into a storage unit and the frame display time corresponds to an expected display time of a decoded video frame; the target refresh rate is selected from one of a predetermined and constant low refresh rate that is lower than a frame rate of the video stream and a predetermined and constant high refresh rate that is higher than the frame rate of the video stream;

wherein the refresh rate control unit is further configured to:

determine an average frame latency based on frame latencies corresponding to the plurality of the decoded video frames;

select a refresh rate that is lower than the frame rate as the target refresh rate when the average frame latency falls within a first range between 0 and a predetermined video latency threshold; and select a refresh rate that is higher than the frame rate as the target refresh rate when the average frame latency falls within a second range between the predetermined video latency threshold and a frame period of the plurality of the decoded video frames; and wherein the rendering device is configured to control the display device to display the video stream at the target refresh rate.

9. The rendering device of claim 8, wherein the rendering device is configured to:

control the display device to operate at the target refresh rate if an average frame latency exceeds a predetermined value; and control the display device to operate at a default refresh rate if the average frame latency is below the predetermined value.

10. The rendering device of claim 9, wherein the refresh rate control unit is configured to set a refresh rate that is below the default refresh rate as the target refresh rate if the default refresh rate of the display device corresponds to a frame rate of the video stream and the frame latency exceeds the predetermined value.

11. The rendering device of claim 9, wherein the refresh rate control unit is configured to:

set a refresh rate that is lower than the default refresh rate as the target refresh rate if the frame latency falls within a first numerical range; and set a refresh rate that is higher than the default refresh rate as the target refresh rate if the frame latency falls within a second numerical range.

12. The rendering device of claim 8, wherein the refresh rate control unit is configured to:

determine an average frame latency based on frame latencies between the frame ready time and the frame display time of a specific number of decoded video frames among the plurality of decoded video frames; and determine the target refresh rate based on the average frame latency, a target frame latency, and a variable refresh rate control period.

13. The rendering device of claim 8, the video stream is provided by a video source, and the video source is a cloud gaming service platform or a wireless projection source device.

14. The rendering device of claim 8, wherein the frame ready time of a decoded video frame corresponds to the time when the decoded video frame is written to a storage unit of the rendering device, and the frame display time of the decoded video frame corresponds to the timing of a vertical synchronization signal corresponding to displaying the decoded video frame on the display device.

* * * * *